US010616465B2

(12) United States Patent
Chowdhery et al.

(10) Patent No.: US 10,616,465 B2
(45) Date of Patent: Apr. 7, 2020

(54) BANDWIDTH EFFICIENT VIDEO SURVEILLANCE SYSTEM (71) Applicant: Microsoft Technology Licensing, LLC, Redmond, WA (US)

(72) Inventors: Aakanksha Chowdhery, Seattle, WA (US); Paramvir Bahl, Bellevue, WA (US); Tan Zhang, Madison, WI (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 318 days.

(21) Appl. No.: 14/856,340

(22) Filed: Sep. 16, 2015

(65) Prior Publication Data

US 2017/0078626 A1 Mar. 16, 2017

(51) Int. Cl.
*H04N 5/232* (2006.01)
*H04N 7/18* (2006.01)
*G08B 13/196* (2006.01)

(52) U.S. Cl.
CPC ..... *H04N 5/23206* (2013.01); *H04N 5/23222* (2013.01); *H04N 7/181* (2013.01); *G08B 13/19656* (2013.01); *G08B 13/19667* (2013.01)

(58) Field of Classification Search
CPC .......... G08B 13/19656; G08B 13/1966; G08B 13/19667; H04N 5/23206; H04N 5/23222; H04N 7/181; H04N 7/188
USPC ................................................. 348/143–159
See application file for complete search history.

(56) References Cited

U.S. PATENT DOCUMENTS

| 6,519,004 | B1 * | 2/2003 | Bahl | H04N 21/234327 |
| | | | | 348/385.1 |
| 8,824,382 | B2 | 9/2014 | Shu et al. | |
| 9,002,057 | B2 | 4/2015 | Outtagarts et al. | |
| 2004/0130620 | A1 * | 7/2004 | Buehler | G06K 9/00335 |
| | | | | 348/143 |
| 2006/0044446 | A1 * | 3/2006 | Porter | G06K 9/00228 |
| | | | | 348/333.11 |
| 2008/0129825 | A1 * | 6/2008 | DeAngelis | A63B 24/0021 |
| | | | | 348/169 |
| 2011/0013018 | A1 * | 1/2011 | Leblond | G06T 17/05 |
| | | | | 348/143 |
| 2011/0169950 | A1 | 7/2011 | Weaver | |

(Continued)

FOREIGN PATENT DOCUMENTS

| CN | 101936900 A | 1/2011 |
| CN | 104092993 A | 10/2014 |

(Continued)

OTHER PUBLICATIONS

Satyanarayanan, et al., "Edge Analytics in the Internet of Things", In Journal of IEEE Pervasive Computing, Apr. 2015, pp. 24-31.

(Continued)

*Primary Examiner* — Christopher S Kelley
*Assistant Examiner* — Kathleen M Walsh
(74) *Attorney, Agent, or Firm* — Schwegman Lundberg & Woessner, P.A.

(57) ABSTRACT

A system and method are disclosed for providing a real-time wireless video surveillance system. The video surveillance system leverages edge computing to enable wireless video surveillance distributing video processing between edges of the network and the cloud to reduce the amount of video that is uploaded to the cloud for analysis.

11 Claims, 7 Drawing Sheets

(56) References Cited

U.S. PATENT DOCUMENTS

| | | | |
|---|---|---|---|
| 2012/0179742 A1* | 7/2012 | Acharya | H04N 7/18 709/202 |
| 2012/0274777 A1* | 11/2012 | Saptharishi | H04N 7/18 348/159 |
| 2013/0166711 A1* | 6/2013 | Wang | H04N 7/181 709/223 |
| 2014/0085480 A1* | 3/2014 | Saptharishi | G06F 16/71 348/159 |
| 2014/0098671 A1* | 4/2014 | Raleigh | H04L 69/14 370/235 |
| 2014/0267752 A1 | 9/2014 | Huang | |
| 2014/0300739 A1* | 10/2014 | Mimar | H04N 7/188 348/148 |
| 2015/0077548 A1 | 3/2015 | Meredith et al. | |
| 2015/0081721 A1* | 3/2015 | Ptitsyn | H04N 21/2187 707/748 |
| 2015/0324635 A1* | 11/2015 | Tanaka | G06F 3/041 348/150 |
| 2015/0358537 A1* | 12/2015 | Mirza | H04N 21/25841 348/231.99 |
| 2015/0381943 A1* | 12/2015 | Renkis | H04N 7/181 348/159 |
| 2016/0249017 A1* | 8/2016 | Leblond | H04N 7/18 |
| 2016/0253883 A1* | 9/2016 | Westmacott | H04N 7/181 |
| 2016/0335484 A1* | 11/2016 | Xie | G06K 9/00335 |

FOREIGN PATENT DOCUMENTS

| | | | | |
|---|---|---|---|---|
| CN | 104504908 A | | 4/2015 | |
| MY | WO 2014092547 A1 * | | 6/2014 | ....... G08B 13/19693 |
| RS | 20130031 A1 | | 10/2014 | |

OTHER PUBLICATIONS

"HiveCAM TM Intelligent Wireless Mesh Distributed Edge Camera System Released", Published on: Mar. 17, 2015 Available at: https://www.iscwest.com/_novadocuments/80741?v=635633507242000000.

Shen, et al., "C2EM: Cloud-Assisted Complex Event Monitoring in Wireless Multimedia Sensor Networks", In EURASIP Journal on Wireless Communications and Networking, Apr. 30, 2015, 13 pages.

Yu, Eileen, "Singapore releases TV White Space Regulatory Framework", Published on: Jun. 16, 2014 Available at: http://www.zdnet.com/article/singapore-releases-tv-white-space-regulatory-framework/.

Ogbasi, et al., "An Efficient Wireless Video Surveillance Network System", In African Journal of Computing & ICT, vol. 7, No. 1, Jan. 2014, pp. 59-68.

"Motion JPEG Video Codec", Retrieved on: Aug. 11, 2015, Available at: http://www.digitalpreservation.gov/formats/fdd/fdd000063.shtml.

"MPEG-4", Retrieved on: Aug. 11, 2015, Available at: http://mpeg.chiariglione.org/standards/mpeg-4.

Coifman, et al., "A Real-time Computer Vision System for Vehicle Tracking and Traffic Surveillance", In Proceedings of Transportation Research Part C: Emerging Technologies, vol. 6, Issue 4, Aug. 1998, pp. 271-288.

Dao, et al., "Managing Redundant Content in Bandwidth Constrained Wireless Networks", In Proceedings of the 10th ACM International on Conference on emerging Networking Experiments and Technologies, Dec. 2, 2014, pp. 349-362.

Demers, et al., "Analysis and Simulation of a Fair Queueing Algorithm", In Symposium proceedings on Communications architectures & protocols, Aug. 1, 1989, 12 pages.

"Doodle Labs", Retrieved on: Aug. 11, 2015, Available at: http://www.doodlelabs.com/products/radio-transceivers/sub-ghz-range/174-790-mhz-tv-band-devices/.

"Dropcam", Retrieved on: Aug. 11, 2015, Available at: https://www.dropcam.com.

Gibbons, et al., "Irisnet: An Architecture for a Worldwide Sensor Web", In Proceedings of IEEE Pervasive Computing, vol. 2, Issue 4, Oct. 2003, pp. 22-33.

Gupta, et al., "Bolt: Data Management for Connected Homes", In Proceedings of the 11th USENIX Conference on Networked Systems Design and Implementation, Apr. 2, 2014, 14 pages.

Ha, et al., "Towards Wearable Cognitive Assistance", In Proceedings of the 12th annual international conference on Mobile systems, applications, and services, Jun. 16, 2014, pp. 68-81.

Han, et al., "Glimpse Data: Towards Continuous Vision-Based Personal Analytics", In Proceedings of the workshop on physical analytics, Jun. 2014, pp. 31-36.

Hu, et al., "The Case for Offload Shaping", In Proceedings of the 16th International Workshop on Mobile Computing Systems and Applications, Feb. 12, 2015, pp. 51-56.

Reinsel, et al., "The Digital Universe in 2020: Big Data, Bigger Digital Shadows, and Biggest Growth in the Far East", Published on: Dec. 2012 Available at: http://www.emc.com/collateral/analyst-reports/idc-the-digital-universe-in-2020.pdf.

Kozut, et al., "Robust Perceptual Image Hashing via Matrix Invariants", In Proceedings of International Conference on Image Processing, vol. 5, Oct. 24, 2004, pp. 3443-3446.

Lowe, David G., "Object Recognition from Local Scale-Invariant Features", In Proceedings of the Seventh IEEE International Conference on Computer Vision, Sep. 20, 1999, 8 pages.

Monga, et al., "Perceptual Image Hashing via Feature Points: Performance Evaluation and Tradeoffs", In Proceedings of IEEE Transactions on Image Processing, vol. 15, Issue 11, Nov. 2006, pp. 3453-3466.

Płaczek, Bartłomiej, "A real-Time Vehicles Detection Algorithm for Vision-Based Sensors", In Proceedings of the International Conference on Computer Vision and Graphics: Part II, Sep. 20, 2010, 9 pages.

Ra, et al., "Odessa: Enabling Interactive Perception Applications on Mobile Devices", In Proceedings of the 9th international conference on Mobile systems, applications, and services, Jun. 28, 2011, pp. 43-56.

Satyanarayanan, et al., "The Case for VM-Based Cloudlets in Mobile Computing", In Journal of IEEE Pervasive Computing, vol. 8, Issue 4, Oct. 2009, pp. 14-23.

Shreedhar, et al., "Efficient Fair Queuing Using Deficit Round Robin", In Proceedings of the ACM SIGCOMM Conference on Applications, Technologies, Architectures, and Protocols for Computer Communication, Aug. 28, 1995, pp. 231-242.

"Spectrum Bridge", Retrieved on: Aug. 11, 2015 Available at: http://spectrumbridge.om/Home.aspx.

Wang, et al., "InSight: Recognizing Humans without Face Recognition", In Proceedings of the 14th Workshop on Mobile Computing Systems and Applications, Feb. 26, 2013, 6 pages.

Wang, et al., "WalkSafe: A Pedestrian Safety App for Mobile Phone Users Who Walk and Talk While Crossing Roads", In Proceedings of the Twelfth Workshop on Mobile Computing Systems & Applications, Feb. 28, 2012, 6 pages.

You, et al., "CarSafe App: Alerting Drowsy and Distracted Drivers using Dual Cameras on Smartphones", In Proceeding of the 11th annual international conference on Mobile systems, applications, and services, Jun. 25, 2013, pp. 13-26.

Zhang, et al., "Video Surveillance using a Multi-Camera Tracking and Fusion System", In Journal of Workshop on Multi-camera and Multimodal Sensor Fusion Algorithms and Applications, Oct. 2008, 13 pages.

Biswas, et al., "Large-scale Measurements of Wireless Network Behavior", In Proceedings of the ACM SIGCOMM Conference on Applications, Technologies, Architectures, and Protocols for Computer Communication, Retrieved on: Aug. 11, 2015, 13 pages.

Gudis, et al., "An Embedded Vision Services Framework for Heterogeneous Accelerators", In Proceedings of IEEE Conference on Computer Vision and Pattern Recognition Workshops, Jun. 23, 2013, pp. 598-603.

(56) References Cited

OTHER PUBLICATIONS

"Mkomo.com. A History of Storage Cost", Retrieved on: Aug. 11, 2015 Available at: http://www.mkomo.com/cost-per-gigabyte-update.

Moshnyaga, et al., "A Hardware Design of Camera-based User's Presence Detector", In Proceedings of IEEE International Conference on Systems, Man and Cybernetics, Oct. 12, 2008, pp. 429-432.

Sikora, Thomas, "The MPEG-4 Video Standard Verification Model", In Proceeding of IEEE Transactions on Circuits and Systems for Video Technology, vol. 7, Issue 1, Feb. 1997, pp. 19-31.

Theocharides, et al., "Embedded Hardware Face Detection", In Proceedings of 17th International Conference on VLSI Design, Jan. 5, 2004, 6 pages.

Tian, et al., "IBM smart surveillance system (S3): event based video surveillance system with an open and extensible framework", In Journal of Machine Vision and Applications, vol. 19, Issue 5-6, Sep. 2008, 2 pages.

\* cited by examiner

Fig. 3
(Step 202)

*Fig. 4*
*(Step 206)*

*Fig. 5*
*(Step 206)*

BANDWIDTH EFFICIENT VIDEO SURVEILLANCE SYSTEM

BACKGROUND

Internet-enabled wireless surveillance cameras are widely used today in a variety of settings for monitoring behavior, activity and other dynamic information. Some popular uses of surveillance systems include monitoring premises and public spaces for security and potential threats, monitoring the flow of vehicle traffic for traffic management, and monitoring the flow of people at retail establishments for retail analytics. Wireless surveillance cameras are closed-circuit television cameras that wirelessly transmit video signals from one or more cameras to a wireless receiver. Once uploaded to the receiver, the video may be reviewed and analyzed, for example by a human operator.

Conventional wireless surveillance cameras are 'dumb' devices, in that they simply capture video and wirelessly upload the video to the receiver. However, given the increasing use of wireless surveillance systems, the Terabytes of raw video which are often uploaded can easily surpass the bandwidth capacity of the wireless network, resulting in bottlenecks and delays. Additionally, the large amount of uploaded video in a video surveillance system presents both a data storage issue and a significant data analysis and management problem.

SUMMARY

The present technology relates in general to a real-time wireless video surveillance system that leverages edge computing to enable wireless video surveillance distributing video processing between edges of the network and the cloud to reduce the amount of video that is uploaded to the cloud for analysis. In addition to conserving wireless bandwidth resources, the present technology easily scales to many cameras and easily expands its region of coverage in a crowded wireless spectrum. The system includes a number of video cameras, each with an associated edge compute node. Each edge compute node in turn communicates with a central controller via wireless access points and a network such as the Internet. The process flow may begin with a user inputting a query into the controller, such as locating people or objects of interest, counting the number of people passing in an area of interest, or locating people seen nearby a person of interest in the surveillance video.

Search parameters based on the query are then communicated to the edge compute nodes. The edge compute nodes locally process each camera's video feed with lightweight, stateless vision algorithms such as motion and object detection, as well as object and/or facial recognition. The processing at the edge compute nodes results in a stream of analytic data comprising the indices of significant frames in the raw surveillance video stream. This analytic data may be arrays of integer values from different edge compute nodes, over a discrete time period, which analytic data may be uploaded to the controller using little bandwidth. The edge compute nodes may also locally stores video footage temporally-close to frames of significance for subsequent retrieval.

Once the controller has received the analytic data from cameras' video frames, it determines the relative importance of different frames to the query at hand. This allows the controller to prioritize more important frames over less important frames when wireless capacity is scarce. To quantify frames' relative importance, the controller examines the analytic data from different edge compute nodes and selects an edge compute node having the highest average count of objects or people being tracked over the discrete time period. The controller then requests upload of video frames from the selected edge compute node, prioritizing those frames having the largest count of the objects or people being tracked. This video content-aware uploading strategy suppresses a large fraction of unrelated image data, conserving utilization of the scarce wireless medium while simultaneously boosting the responsiveness of the system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Embodiments of the present technology relate to a wireless surveillance system, and a method of its operation, for capturing, processing and intelligent uploading video. In general, the present technology maximizes the number of query-specified objects or people uploaded in the video, while minimizing the bandwidth required to upload the video. In examples, the wireless surveillance system includes one or more video cameras and one or more edge compute nodes ("ECNs") collocated and associated with the one or more video cameras. The system further includes a controller for receiving data and signals from the one or more edge compute nodes and intelligently managing the upload of video from the one or more video cameras.

Each ECN may be a computing device, associated with a video camera, which executes code for processing a video signal captured by the video camera. Each ECN may execute stateless vision algorithms for analyzing captured video and extracting analytic data relating to objects or people of interest in the video. In one example, each ECN may execute motion detection algorithms, object detection algorithms, body or face detection algorithms, object recognition algorithms and/or facial recognition algorithms for detecting and recognizing people and/or objects within video captured by its associated video camera. The ECNs may execute other vision algorithms in further embodiments. In embodiments, each ECN executes the same vision algorithms, though it is conceivable that different ECNs execute different algorithms in further embodiments.

One or more frames of the video signal from different cameras may be processed at the ECNs for example to recognize one or more people and/or objects to be tracked in the video frame(s), and to generate analytic data based on the recognition. The people and/or objects being tracked may be referred to herein as items being tracked, or tracked items. In one example, the analytic data may include the number of tracked items detected at different times over a discrete period of time, as explained below. The ECNs may also perform video compression and indexing of the received video frames, and may further maintain a short-term store of the received video frames.

The controller in the wireless surveillance system may include one or more computing devices such as for example one or more web-connected servers. The controller may be remote from the ECNs and communicate with the ECNs over a wireless network, for example including the Internet and one or more wireless access points. In embodiments, the controller may generate and communicate a query instructing the ECNs in the system to return analytic data relating specific subjects, for example people or objects, captured by the video cameras. Upon receipt and processing of the requested analytic data, the controller sends a request to one or more ECNs to upload video just those frames of interest, such as for example those video frames where the number of people or objects being tracked has changed and/or is maximized. In this way, a fraction of the video frames captured by the video cameras is wirelessly uploaded to the controller to conserve bandwidth and prevent wireless network bottlenecks.

The present system may further group two or more video cameras from a surveillance system into groups, referred to herein as clusters. Video camera clusters are arranged to capture video from the same geographic area and may include overlapping views of the area. In accordance with further aspects of the present technology, the controller may receive analytic data from the ECNs associated with the cameras in the cluster, and perform intra-cluster processing to determine the most valuable frames from cameras in the cluster to upload. This allows elimination of redundant observations from multiple cameras in a cluster, and further lowers the use of wireless bandwidth.

Figure 1:
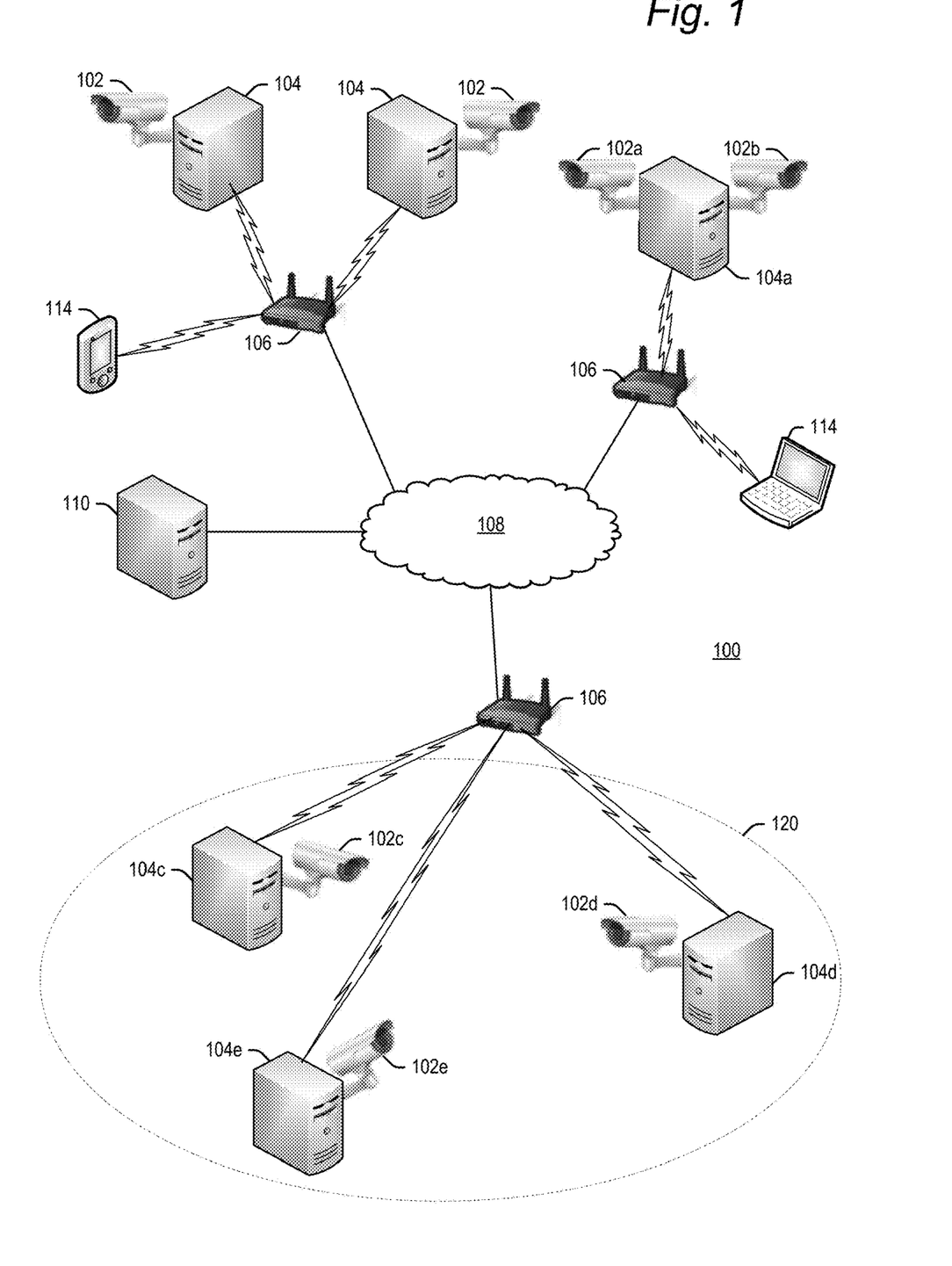
FIG. 1 is a block diagram of an example of a surveillance system according to embodiments of the present technology.

FIG. 1 shows a block diagram of a surveillance system 100 according to embodiments of the present technology. As explained below, the system 100 includes a plurality of video cameras 102, associated ECNs 104 and a controller 110 in communication with each other via wireless transmitters 106 and network 108. It is understood that the particular example of the surveillance system 100 shown in FIG. 1 is by way of example only, and the system 100 may include more, less and different arrangements of video cameras 102, ECNs 104 and/or wireless transmitters 106.

Each video camera 102 may have an associated co-located ECN 104. Video cameras 102 may capture video of a geographic area and send the video to its associated ECN 104 via a wired connection, or wireless connection for example via Bluetooth or other near field wireless communications protocols. In further embodiments, a video camera 102 may be integrated as part of a computing device used as an ECN 104, or vice-versa. In embodiments, each ECN 104 may have a single, associated video camera 102. However, it is conceivable that a single ECN 104 have two or more associated video cameras 102, as shown for example by ECN 104a having two associated video cameras 102a and 102b. In such embodiments, ECN 104a may receive and process the video from cameras 102a and 102b in parallel, and then forward separate analytic data, and possibly images from the cameras 102a and 102b to a controller 110 as explained below.

Video cameras 102 may be conventional, off-the-shelf video surveillance cameras. The video captured by cameras 102 may include image data, or image and audio data. The video cameras 102 may be wall, ceiling or floor mounted as desired so as to have a field of view of a geographic area to be captured. In examples, a single video camera 102 may be sufficient to capture the geographic area. In further embodiments, the geographic area may be large so that a number of video cameras 102 may be used to capture different sections, together covering the entire geographic area. In further embodiments, multiple cameras in a cluster may be arranged to capture the same geographic area from different perspectives as explained below. The video cameras 102 in the surveillance system 100 may be the same as each other, or two or more cameras 102 may be different from each other.

ECNs 104 may be connected to respective video cameras 102 via cables or a wireless connection. An example of an ECN 104 is shown in greater detail in FIG. 7, but an ECN 104 may be any of a variety of computing devices. In one example, ECNs 104 may be a server, desktop computer, laptop computer, smart phone or smart personal digital assistant. In further embodiments, one or more of the ECNs 104 may simply be a computing device comprising a microprocessor, non-volatile memory and a network adapter storage. In such an embodiment, the ECN 104 may operate without an input/output device and/or without a monitor. The ECNs 104 in the surveillance system 100 may be the same as each other, or two or more ECNs 104 may be different from each other.

A group of two or more video cameras 102 and ECNs 104 may be grouped together into a cluster 120. Video cameras in a cluster 120 may be arranged to capture video of the same geographic area from different perspectives, and may include overlapping views of the area. FIG. 1 illustrates cameras 102c, 102d and 102e, and associated ECNs 104c, 104d and 104e, in a cluster 120. While cluster 120 includes three video camera/ECN pairs, a cluster may include two video camera/ECN pairs or more than three video camera/ECN pairs in further examples. Additionally, while a single cluster 120 is shown, there may be multiple clusters 120 capturing different portions of a geographic area.

Having a cluster of cameras trained on overlapping portions of a geographic area increases the likelihood that at least one of the cameras in the cluster will capture all people or objects of interest in the area. Conventionally, cameras trained on overlapping portions of an area would each upload their video for analysis, despite the fact that the cameras may often capture redundant views of the same objects or people. In accordance with aspects of the present technology, processing at the ECNs allows selection of video having information most relevant to the query from one or more ECNs in a cluster, while avoiding upload of redundant views from multiple cameras.

The surveillance system 100 may further include a controller 110, which in embodiments may be one or more computing devices such as a web-connected server or servers located remotely from the ECNs 104. An example of an controller 110 is shown in greater detail in FIG. 7, but in general the controller may include a processor executing software code for controlling which ECNs upload video, and which video frames from these ECNs are uploaded to the controller 110, as explained below. The controller 110 may include I/O components for receiving queries from users for setting image search parameters as is also explained below. The controller 110 may further include non-volatile storage for storing video frames received from one or more of the ECNs 104, and a network adapter for connecting to a network.

In embodiments, the controller 110 may be remote from the ECNs 104. However, in further embodiments, the controller 110 may be incorporated into one or more of the ECNs 104. In such embodiments, these one or more ECNs would serve the dual purpose of processing video from its/their associated video camera(s), and wirelessly communicating with other ECNs in the surveillance system to control which video frames the other ECNs upload.

The ECNs 104 may communicate with the controller 110 via wireless access points such as one or more wireless routers or transmitters 106, and a network 108 such as the Internet. The wireless transmitters 106 and network 108 may transmit instructions from the controller 110 to the ECNs 104, and analytic data and image data from the ECNs 104 to the controller 110. A group of two or more ECNs may form a wireless domain, using the bandwidth of a single wireless transmitter 106. The ECNs in such a wireless domain may comprise a cluster 120, capturing overlapping views of a single area, or they may comprise ECNs capturing different portions of a geographic area. When transmitting image data, the ECNs 104 and wireless transmitters 106 may use whitespace frequencies to maximize available bandwidth. However, the ECNs 104 and wireless transmitters 106 may transmit using any of a variety of other frequencies in the radio spectrum using 802.11 baseband protocols.

As discussed in the Background section, video cameras 102 capture a vast amount of video data, and uploading all of this data via the wireless transmitters 106 for analysis at the controller 110 would often result in bottlenecks and loss of potentially valuable image data. Therefore, aspects of the present technology leverage edge computing to partition a segment of the video processing to edges of the surveillance system network, i.e., at the ECNs. This partitioning enables the controller to intelligently select only those portions of the video from the cameras in the surveillance system likely to include video of interest and which satisfies the search query parameters input to the controller. In addition to relieving bandwidth and controller processing constraints, the system of the present technology is highly scalable. New video cameras and ECNs may be added to the system without adding or only marginally adding to bandwidth use and controller processing.

Figure 2:
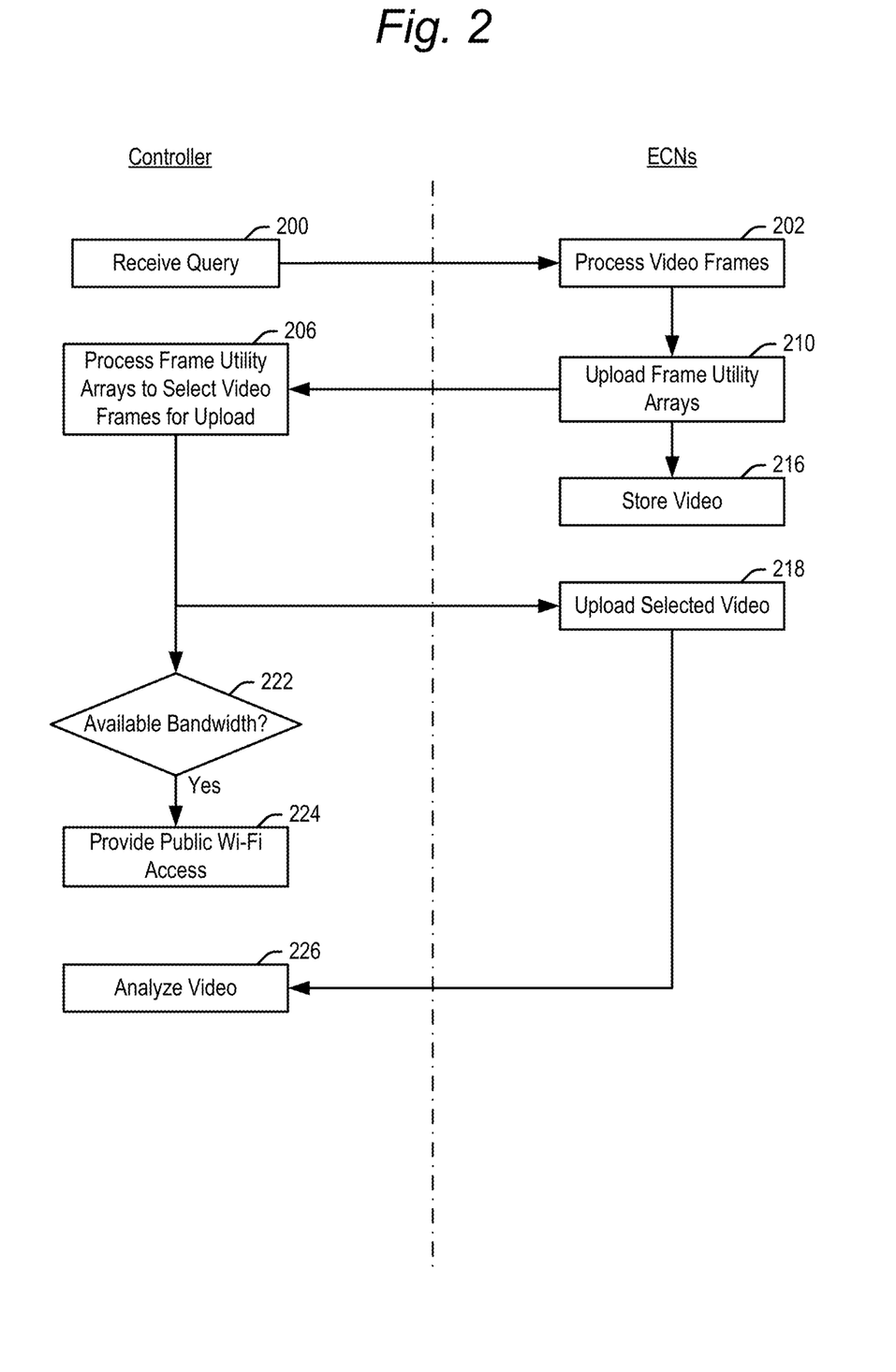
FIG. 2 is a high level flowchart of an embodiment of the present technology.

FIG. 2 is a high level flowchart illustrating the operation of the surveillance system 100 in accordance with embodiments of the present technology. The operation may start in step 200 with the input of a query into the controller 110 defining search parameters for what video the controller is interested in collecting. The queries may for example relate to locating people or objects of interest, counting the number of people within an area or passing in an area of interest, or locating people seen nearby a person of interest. Other types of queries are possible. The query may be input by a human operator of the controller 110, but it is contemplated that queries be automatically generated by the controller 110 in accordance with user-defined directives in further embodiments.

The query and/or parameters defined by the query are sent to the ECNs 104, which process the video from the video cameras 102 in step 202 in accordance with the query and/or query parameters. Further details of video processing step 202 are now described with reference to the flowchart of FIG. 3. Each ECN may execute a video processing software module for processing video from the video cameras 102 in accordance with the received query. Each ECN may process video from its associated video camera in the same way, and the following steps may take place in each ECN, unless otherwise noted.

Figure 3:
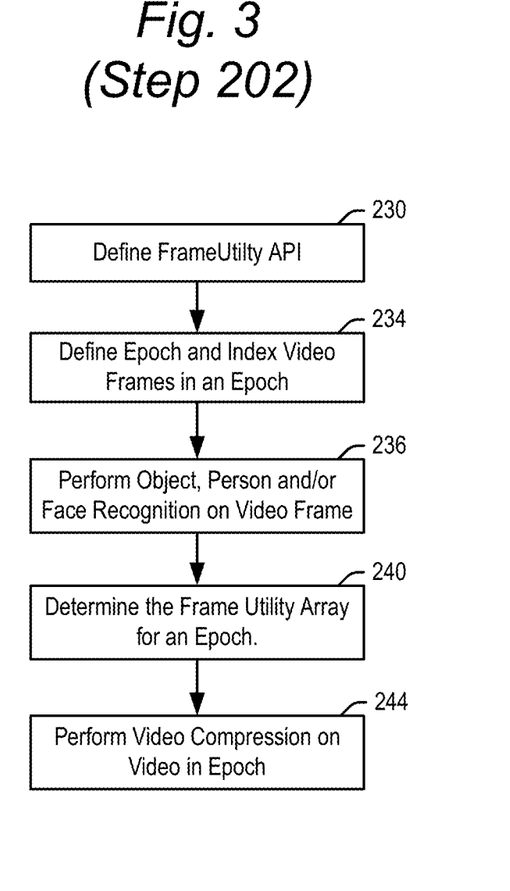
FIG. 3 is a flowchart providing more detail of an embodiment of step 202 of FIG. 2.

In step 230, the parameters of the query received from the controller are used to define a callback API referred to herein as frameUtility. In general, the present technology uses the concept of utility, which is a measure of how relevant the content of captured video frames, of respective video cameras 102, is to a received query. Utility for a given video frame may in general be higher where the video frame contains items that are more relevant to the search query. The ECNs 104 process the video frames for their respective video cameras and determine the utility of one or more video frames to a received query over a given time period. The utility of the measured video frames forms the basis of the analytic data that is returned from each ECN 104 to the controller 110 as explained below.

What is measured by utility will vary depending on the input query. For example, where the query relates to counting the number of people at a particular location under surveillance, utility is defined to be the number of people visible in each successive video frame from video cameras capturing that location. As another example, where the query relates to locating people or objects of interest, utility is defined as to be '1' if the object of interest is found in the frame, and '0' otherwise. As a further example, where the query relates to determining probabilities as to whether captured people or objects are in fact the people or objects sought by a query, utility may be defined as a probabilistic value, such as a number between 1 and 100, or a number between 0 and 1. It is understood that utility may be defined in other ways, based on other parameters which may be set up by a user for a given search query.

Utility for video frames of a given ECN 104 may be determined by processing the video frames using one or more vision algorithms as explained below. The determined utility for each video frame processed by respective ECNs may be stored as a value referred to herein as frameUtility. As indicated above, frameUtility may be an integer or non-integer value. While frameUtility, and the utils array explained below, may determine an analytic data value for each video frame, it is understood that frameUtility and the utils array may determine an analytic data value for time periods, referred to herein as time slots, which may a single video frame or multiple video frames.

In step 234, some predefined number of video frames may be grouped together into a discrete time period referred herein as an epoch. In embodiments, an epoch may be a relatively small number of video frames, such as ten. However, it is understood that the number of video frames in an epoch may be smaller or greater than ten in further embodiments. The frames in an epoch may also be indexed in step 234. For example, the frames in a ten frame epoch may be indexed as frames 0 to 9.

Each ECN may run one or more of a variety of vision algorithms, including for example object tracking and recognition software, human identification and tracking software and facial recognition software, depending on the types of queries to be received by the controller and implemented by the ECNs. In step 236, depending on the query, the ECN may perform object, person and/or facial recognition on objects and people within each frame in the epoch.

In step 240, each ECN may next determine the frame utility array, util, which is the frameUtility count for each frame in an epoch, based on the defined parameters of the frameUtility API. For instance, the query may ask the ECNs to track the number of objects (or the number of a certain type of object) appearing in the video of the associated video cameras. As explained below, this analytic data is all that need be uploaded from the ECNs 104 to the controller 110 for the controller to make an intelligent determination as to which video to upload to satisfy the query.

In one example, there may be two ECNs, ECN[1] and ECN[2] in a cluster tracking the objects captured from first and second associated video cameras. Also assume for this example that the first video camera captures ten frames of video in the epoch in which the number of tracked objects in the ten successive frames are 1, 1, 3, 3, 3, 3, 3, 1, 1, 1, respectively. Assume for this example that the second video camera captures video in which the number of tracked objects is 1 for the entire ten frames of the epoch. The associated ECN[1] and ECN[2] may then determine util[1] and util[2] for the epoch as shown in Table 1:

TABLE 1

| | Frame Index | | | | | | | | | |
|---|---|---|---|---|---|---|---|---|---|---|
| | 0 | 1 | 2 | 3 | 4 | 5 | 6 | 7 | 8 | 9 |
| util[1] | 1 | 1 | 3 | 3 | 3 | 3 | 3 | 1 | 1 | 1 |
| util[2] | 1 | 1 | 1 | 1 | 1 | 1 | 1 | 1 | 1 | 1 |

If there are other video cameras, the ECNs for these video cameras may determine the frame utility array util for the epoch for those cameras in step 240 as well. As noted, the above is merely by way of example, and what is measured by the frame utility array util will vary depending on the search criteria used in the query. However, each ECN may calculate the frame utility array util in the same manner, and, in embodiments, each frame utility array util will return an array of integer numbers.

In step 244, an ECN may further run a video compression algorithm to compress the video captured during an epoch by its associated video camera. Referring again to the flowchart of FIG. 2, in step 210, analytic data in the form of the frame utility arrays for the respective ECNs may be uploaded to the controller. As the arrays are small files (as opposed to the video data captured over the epoch), all of the util arrays for the various ECNs may be uploaded without an appreciable impact on wireless bandwidth. However, in further embodiments of the present technology, video frame data associated with one or more of the indexed frames in the util arrays may also be uploaded with the frame utility arrays. In step 216, the ECNs may store the compressed video from their associated video cameras. Periodically, the ECNs may purge stored video which has been stored longer than some predetermined period of time.

In step 206, the controller may process the frame utility arrays received in step 210 according to a scheduling algorithm, which examines each of the uploaded frame utility arrays util in order to determine which video to upload and from which ECN to upload it. Further details of two different embodiments of step 206 are described below with reference to the flowcharts of FIGS. 4 and 5, respectively.

As noted above, two or more video cameras may be set up in a cluster 120 (FIG. 1) to capture the same geographic area from different positions. In accordance with aspects of the present technology, where views are duplicative, the scheduling algorithm may intelligently select the view from a single video camera to upload in order to upload the most relevant video while avoiding upload of duplicative images and unnecessary use of bandwidth. The following example uses a cluster containing the two ECNs of Table 1 above. It is understood that the following can be expanded to apply to clusters of greater than two ECNs in further embodiments.

Figure 4:
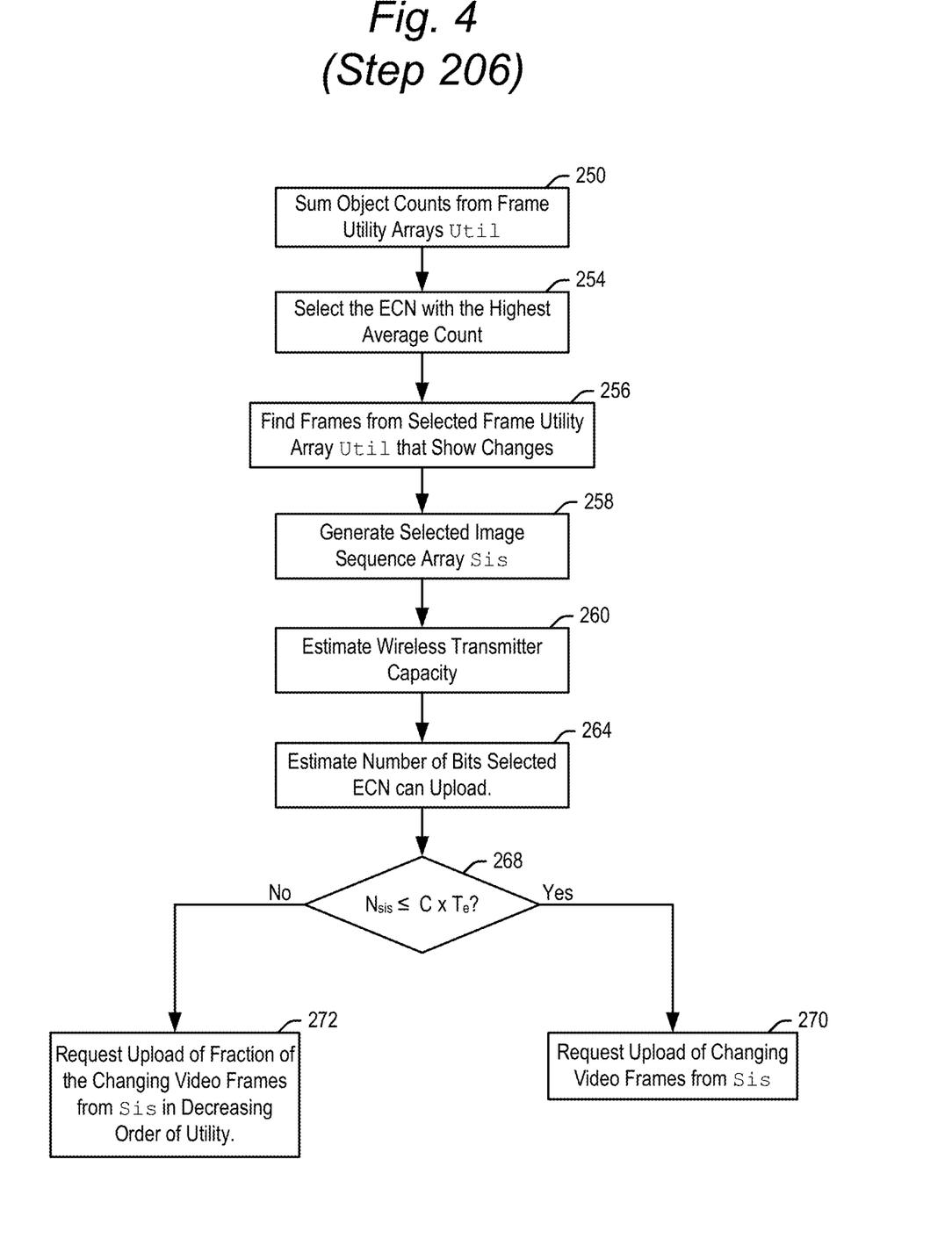
FIG. 4 is a flowchart providing more detail of an embodiment of step 206 of FIG. 2.

Referring now to FIG. 4, in step 250, the controller sums the object counts from the respective frame utility arrays util over the epoch for each ECN. In step 254, the controller selects the ECN and associated camera with the highest average counts (most information about the scene) in the epoch. In the running example of Table 1, ECN[1] has an average of 2, while ECN[2] has an average of 1. Thus, the algorithm selects ECN[1] associated with the first camera for further processing. As noted above, some video cameras 102 may not be part of a cluster. Step 254 may be skipped for the ECNs 104 associated with such non-cluster cameras.

In step 256, the controller 110 processes the frame utility array for the selected ECN, finding the frames in the epoch that show changes to the number of tracked objects in the scene. For example, in util[1], the number of tracked objects changed from 1 to 3 in the frame 2, and from 3 to 1 in frame 7. The number of tracked items also changed from 0 to 1 in the first frame, frame 0. The frame indexes showing changes and the utility (count) in the changed frame is provided in a selected image sequence array, referred herein as the sis array, in step 258 as shown in Table 2 below:

TABLE 2

| sis: | (2,3) | (7,1) | (0,1) |
|---|---|---|---|

The sis array contains (frame index; utility), sorted by utility such that the frame index with the highest count may be listed first. Ties may be broken in utility by favoring the sis element with the longer duration sequence of images (covered by more frame indexes). The sis array contains information about maximum object counts as well as frames where the number of tracked objects changes. In further embodiments, it is conceivable that the sis array contain a single element including the frame having the maximum object and the object count for that frame. In such an embodiment, the sis element would be (2,3) in the above example.

Sending data at a faster rate than the capacity of the wireless transmitter 106 from an ECN 104 causes network congestion, leading to frames being dropped. To avoid congestion, in step 260, the controller estimates the wireless transmitter capacity C (in bits per second) available from each ECN by examining the near-term sending rates and the loss rates. In step 264, the processing algorithm in the controller takes as input the estimated available wireless capacity C, and estimates the number of bits that the selected ECN can upload via its associated wireless transmitter 106. It may be assumed that ECNs within a cluster have similar wireless links to controller.

In step 268, the controller 110 sends a conditional control message to the selected ECN soliciting an upload. The size (in bits) of the frames in the sis may be $N_{sis}$ and the length of the epoch in seconds may be $T_e$. If $N_{sis} \leq C \cdot T_e$, the controller requests the selected ECN to upload each of the changing video frames in the epoch indicated in the sis array after compression (step 270). Otherwise, the controller requests that the selected ECN upload a fraction of the compressed images in sis in the decreasing order of utility (step 272). In the example of Table 2, sis[0] has utility of 3, so frame 2 is uploaded first, followed by frame 7 and 0.

Referring again to FIG. 2, upon receipt of the request, the selected ECN may upload the requested data in step 218. This data contains the video frame(s) ascertained to be the most interesting video (best fit to the query) from the ECN ascertained to have the most interesting video (best fit to the query). As it is some fraction of the overall video captured by the cluster during the epoch, and is sent taking into consideration available bandwidth, no data is lost to bandwidth constraints.

Step 206 as described above with respect to FIG. 4 and below with respect to FIG. 5 results in the upload of the most interesting video from a cluster or group of ECNs. The uploaded video may contain the video frames where the number of tracked objects has changed relative to an earlier frame, prioritized to send the video frame showing the most tracked objects first. As noted above, instead of uploading all video frames showing changes, the present technology may upload only the sis element including the frame showing changes and which includes the highest count of tracked objects or people.

Additionally, instead of uploading the individual video frames indicated by the sis array, the present technology may upload some predefined number of frames around the individual video frames indicated by the sis array. As a further alternative indicated below, the present technology may upload the individual video frames indicated by the sis array, and thereafter upload additional frames around the uploaded frames upon a request from a human operator examining the uploaded frames at the controller.

It may happen that the present technology does not use all available bandwidth from one or more wireless transmitters 106 when uploading the selected video in step 218. If so, the one or more wireless transmitters 106 can act as Wi-Fi hotspots for one or more computing devices such as smart phone 114 or laptop 116, as shown in FIG. 1. In step 222, the controller may check whether there is available bandwidth from one or more wireless transmitters before, during or after the ECNs upload the selected image data in step 218. If so, this bandwidth may be dedicated for public use in a Wi-Fi hotspot in step 224.

In step 226, the uploaded video data may be analyzed. This may be done by a human operator, though it is conceivable that the controller may run an algorithm for analyzing the uploaded video data for objects of interest. The human operator or algorithm may optionally send a request for additional video data from frames around the frames uploaded in step 218, which may then be uploaded in accordance with the bandwidth constraints as calculated above. Moreover, while the above steps 206 and 218 result in the upload of one or more individual frames from an epoch, as indicated in the sis array, the algorithm may be modified to upload the one or more individual frames from the sis array, together with one or more video frames before and/or after the individual frames from the si s array.

It is conceivable that the algorithm described with respect to the flowchart of FIG. 4 may lose information when more than one camera in the cluster sees objects of interest that other cameras in the cluster miss. A further processing algorithm of step 206 is described below with respect to the flowchart of FIG. 5 that addresses this issue. The scheduling algorithm described with respect to FIG. 5 targets cases where one camera 102 in a cluster sees objects that other cameras 102 miss so as to select more than one ECN to upload images during a time epoch.

Figure 5:
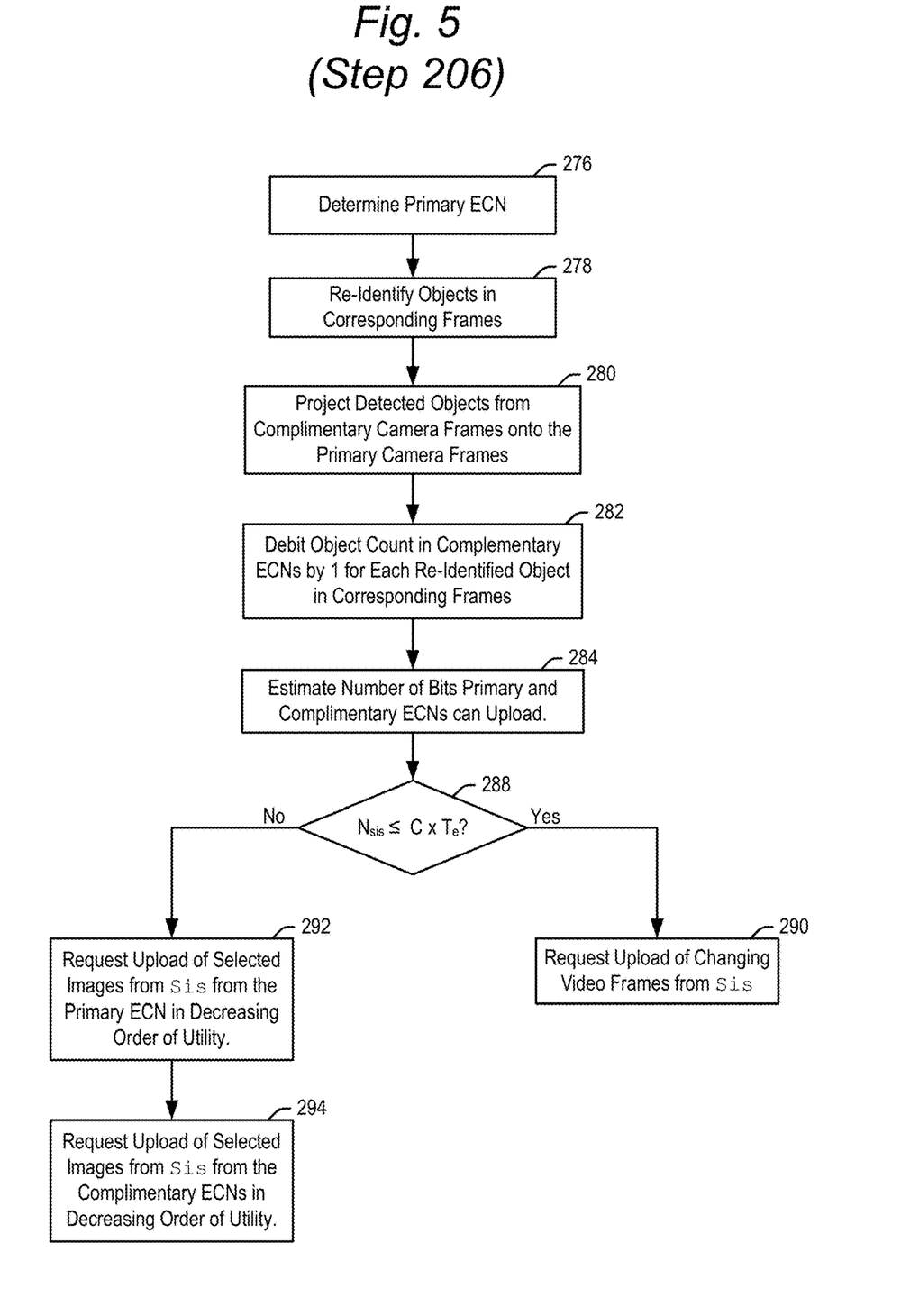
FIG. 5 is a flowchart providing more detail of a further embodiment of step 206 of FIG. 2.

The algorithm of FIG. 5 relies on geometry and known locations of the ECNs to detect redundant viewpoints without actually exchanging the redundant frames. In general, the algorithm first identifies duplicates of the same objects from multiple ECNs in overlapping camera views using object re-identification. It then prioritizes video frames from the cluster, factoring the count of re-identified objects into the frame utility metric.

Figure 6:
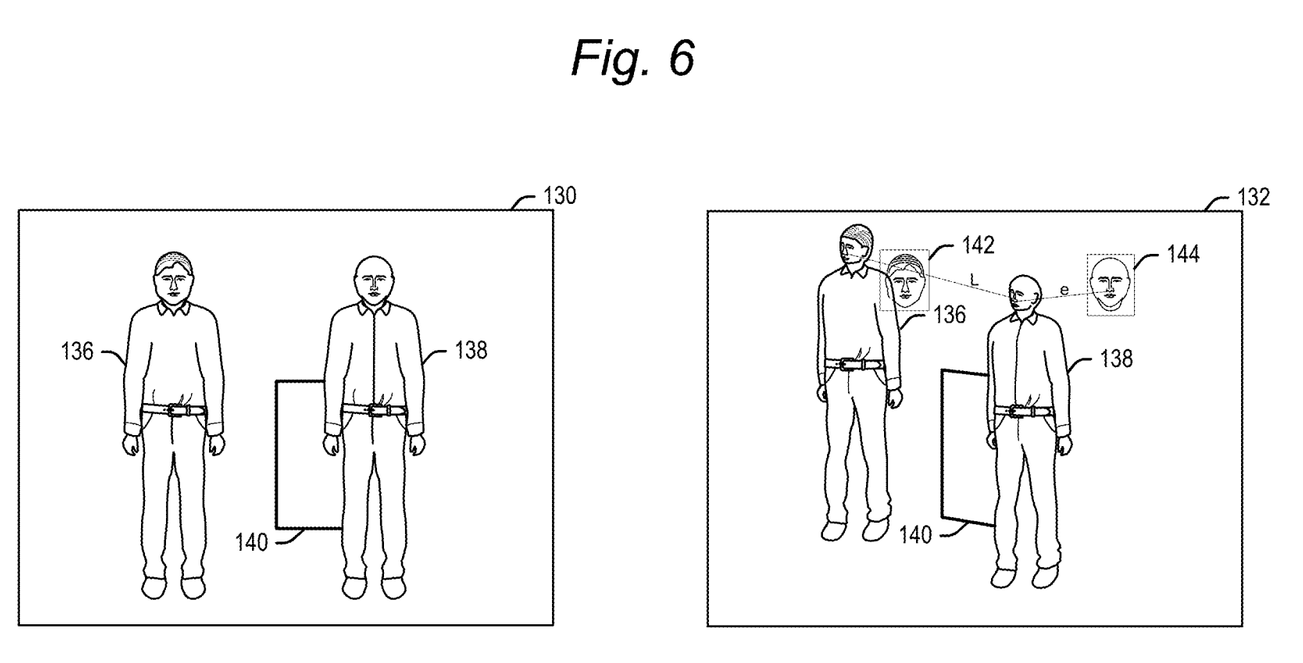
FIG. 6 is an illustration of two frames captured simultaneously from two different cameras for the purpose of identifying people or objects common to both frames.

The controller may run an object re-identification algorithm, which determines redundant objects reported by multiple ECNs in a cluster with overlapping camera views. By selecting the smallest subset of camera views to cover the overlapping views, the unique objects across cameras within a cluster may be identified. In one example, this may accomplished by a process referred to as object re-identification. Operation of the object re-identification algorithm is described for example in Hamdoun et. al., "Person Re-Identification In Multi-Camera System By Signature Based On Interest Point Descriptors Collected On Short Video Sequences," 2nd ACM/IEEE International Conference on Distributed Smart Cameras (2008). However, in general, the re-identification algorithm identifies if the detected face instances in frames from different cameras belong to the same person or not. FIG. 6 shows an example of two image frames 130, 132 captured by two cameras 102 in a cluster that simultaneously detect the faces of two people 136, 138 in their overlapping views. The frames from the different cameras may be time-synched to each other in a known manner to ensure the frames being examined were captured simultaneously.

The re-identification algorithm then selects common reference points between the camera views. For example, the algorithm may detect reference points in the straight lines and/or corners of an object 140 common to both images. The reference points may be determined in a camera calibration phase or extracted with known image processing algorithms, such as the Scale-Invariant Feature Transform (SIFT) algorithm. The SIFT algorithm is described for example in U.S. Pat. No. 6,711,293, entitled, "Method and Apparatus for Identifying Scale Invariant Features in an Image and Use of Same for Locating an Object in an Image," issued Mar. 23, 2004.

The reference points are then used to project any pixel in the first camera's view onto the plane of second camera's view. For example, in FIG. 6, pixels comprising the heads of the people 136, 138 are projected as projections 142, 144 into image frame 132. The detected face instances in the two respective frames are identified as the same person when the distance between projections 142, 144 and the detected faces in frame 132 are below a threshold. For example, the error, e, between the projection and the detected face in image 132 is a lot smaller than the distance, L, between the two different faces captured in image 132. An empirical value may be set to determine the threshold for this projection error e that accounts for an inaccuracy in marking reference points.

It is understood that algorithms other than a re-identification algorithm may be used to find the same people and/or objects in the corresponding video frames from different cameras. For example, where the query is looking for objects in the video, the same objects may be identified in simultaneous frames from different cameras by algorithms including a SIFT algorithm discussed above. Alternatively, a SIFT algorithm may identify reference points common to both images. Using the reference points, pixels including the object of interest from a first image may then be projected onto the second image, and the error e of the detected and projected objects in the second image may be detected as described above. Other techniques are contemplated.

The controller may run the re-identification algorithm by using the center coordinates of the detected faces from frames 130, 132 as part of the analytic data. Thus, all of the images of frames 130, 132 need not be uploaded to the controller for re-identification. To integrate the re-identification technique, the frame utility array util may be modified in the ECNs so that each ECN also uploads the center coordinates of detected faces along with the frame utility to the controller in the utils. The controller can then perform re-identification using the analytic data in utils. Based on the modified frame utility arrays from ECNs, the controller 110 is able to process the frame utility arrays utils in step 206 (FIG. 2). Step 206 of this embodiment is now described in greater detail with reference to the flowchart of FIG. 5.

In step 276, the controller sums and averages the object counts across the ECNs to determine the ECN that has maximal average object counts (thus capturing the most information about the scene). This ECN is designated as the primary ECN. In step 278, the re-identification algorithm may re-identify objects which occur in each simultaneously captured frame from the cameras 102 associated with the primary ECN and the one or more complimentary ECNs. In step 280, the controller then projects the detected objects from the complementary camera views onto the primary camera view as described above for each frame in the epoch. Thus, steps 278 and 280 identify objects which appear in both the video from the primary ECN and the video from the complimentary ECNs.

In step 282, in each frame, the controller debits the object count in each of the complementary ECNs by one for each re-identified object. This produces an updated utility array util for each complementary ECN. For example, Table 3 below shows unique object counts captured by two ECNs after applying object re-identification, along with their utility arrays util. ECN[1] may be selected as the primary camera view given that its average object count over six frames in the epoch is 3.6 compared to 1.2 for ECN[2]. The object count in the frames of util for ECN[2] may then be debited in step 282 by the number of duplicate objects re-identified for each frame in the epoch. Objects which are re-identified in the corresponding frames for ECN[1] and ECN[2] are shown in capital letters in Table 3.

TABLE 3

|  | Frame Index | | | | | |
| --- | --- | --- | --- | --- | --- | --- |
|  | 0 | 1 | 2 | 3 | 4 | 5 |
| object[1] | A, B, c | A, B, c | b, D | b, d | b, D, f, g | b, d, F, g |
| object[2] | A, B | A, B | D, e | e | D, h, i | F, h, i |
| util[1] | 3 | 3 | 2 | 2 | 4 | 4 |
| util[2] | 0 | 0 | 1 | 1 | 2 | 2 |

As indicated in the Table 3, the complementary array util[2] had two objects (a and b) in frame 0. However, a and b were re-identified in both ECNs for frame 0. Thus, the object count of 2 for the complementary array in frame 0 is debited by 2, resulting for an object count of 0 in frame 0 of array util[2] as shown above. The same is true for frame 1 of array util[2]. The array util[2] had two objects (d and e) in frame 2. A single object d was re-identified in frame 2 of both ECNs. Thus, the object count of 2 is debited by 1 resulting for an object count of 1 in frame 2 of complimentary array util[2]. And so on for the remaining frames in the epoch for util[2].

In step 286, the controller determines a selected image sequence of frames in the sis array which covers the primary ECN and any complimentary ECNs. The sis array comprises tuples of (ECN identifier, frame index, utility). As illustrated in Table 4 below, the modified sis array includes the frames captured by the primary ECN[1] having changes in its object count relative to the prior frame (i.e., frames four, zero, two). The sis array also contains frames captured by one or more complimentary ECN(s) when: i) a frame has a changed count (after debiting in step 280) relative to its previous frame, and ii) the corresponding frame captured by the primary ECN fails to cover all the unique objects. For example, in Table 3, the object count for util[2] changes in frame 4, and the objects h and i do not appear in frame 4 of util[1]. Similarly, the object count for util[2] changes in frame 2, and the object e does not appear in frame 2 of util[1]. Thus, frames four and two of the complementary ECN[2] are appended to the sis array as shown in Table 4 below.

TABLE 4

| sys: | (1,4,4) | (1,0,3) | (1,2,2) | (2,4,2) | (2,2,1) |
| --- | --- | --- | --- | --- | --- |

In step 280, the controller estimates the wireless transmitter capacity C (in bits per second) available from each ECN by examining the near-term sending rates and the loss rates. In step 284, the algorithm takes as input the estimated available wireless capacity C, and estimates the number of bits that the primary and complimentary ECNs can upload via their associated wireless transmitter 106. It may be assumed that ECNs within a cluster have similar wireless links to controller.

In step 288, the controller sends a conditional control message to the primary and complimentary (if any) ECNs soliciting an upload. As described above with respect to step 268 (FIG. 4), the size (in bits) of the frames in the sis array may be $N_{sis}$ and the length of the epoch in seconds may be $T_e$. If $N_{sis} \leq C \times T_e$, the controller requests the primary and complimentary ECNs to upload the changing video frames in the epoch indicated in the sis array after compression (step 290). Otherwise, the controller prioritizes the selected images in sis from the primary ECN, in decreasing order of their utility value (step 292). It then polls the selected images in sis from any complementary ECNs, in the order of their debited utility value (step 294).

Referring again to FIG. 2, upon receipt of the requests of steps 290 or 292, the primary ECN may upload the requested data in step 218. Upon receipt of the requests of steps 290 or 294, the complimentary ECNs may upload the requested data in step 218. This data contains the video frame(s) ascertained to be the most interesting video (best fit to the query) from the primary and complimentary ECNs ascertained to have the most interesting video (best fit to the query). As noted above, this uploaded data is some fraction of the overall video captured by the cluster during the epoch, and is sent taking into consideration available bandwidth, so no data is lost to bandwidth constraints. As also described above, any available bandwidth may be used for public Wi-Fi access in steps 222 and 224. In step 226, the uploaded video data may be analyzed as described above.

After determining the priority of frames to be uploaded within a cluster, the controller 110 needs to coordinate upload bandwidth demand across the ECNs and clusters that are within a wireless transmitter domain (i.e., served by a single wireless transmitter access point). To do so, the controller 110 may use a traffic scheduling algorithm based on weighted fair queuing or proportional fairness in throughput to allocate upload rates to each cluster.

Embodiments of the wireless video surveillance system 100 described above leverage edge computing to enable wireless video surveillance distributing video processing between edges of the network and the cloud to reduce the amount of video that is uploaded to the cloud for analysis. In addition to conserving wireless bandwidth resources, the present technology easily scales to many cameras and easily expands its region of coverage. In examples, the present technology allows a surveillance system to scale to between 5 and 200 times its size without additional bandwidth demands, in comparison to a conventional system which uploads all captured video.

The present technology provides advantages described above in minimizing wireless bandwidth needed to a wireless video surveillance system. However, it is contemplated that the present technology may work in wired video surveillance system as well. That is, there is a fully wired connection between the ECNs and the controller. Such an example may operate in accordance with the flowcharts of FIGS. 2-5. However, the steps 268 (FIG. 4) and 288 (FIG. 5) of checking the wireless bandwidth available may be skipped.

As noted above, the controller 110 may be remotely located from the ECNs, for example in the cloud. However, in further embodiments, the controller 110 may be co-located with the ECNs, and be part of a wireless domain of one or more of the ECNs. Additionally, as noted, the controller 110 may be an ECN 104 in further embodiments. In such an example, the controller ECN may wirelessly communicate with other ECNs in the surveillance system 100, and intelligently select the video to upload from the other ECNs in accordance with the technology described above.

Embodiments of the present technology may be employed in a variety of use scenarios to intelligently upload surveillance video using minimal bandwidth of a wireless network. Such scenarios include use of the surveillance system 100 for security and counter-terrorism. ECNs 104 and associated video cameras 102 may be installed in underground transport networks, on buses, and in airports and other public areas. This would allow law enforcement and counter-terrorism agencies to track public threats in real-time. For example, in the event of multiple coordinated attacks on public transport, the video surveillance network can pick out the face of one perpetrator, scan the database of cloud-stored video for other people the perpetrator was spotted with, and then search for those associated persons in real-time as the attack progresses, directing law enforcement to the locations of the perpetrator's accomplices for intervention.

In a further scenario, embodiments of the surveillance system 100 may be used to locate people or objects of interest. For example, the present system may be used to find a person as an "Amber Alert" in the United States, or looking for unattended bags at an airport or other terminal Embodiments of the surveillance system 100 may be used to detect and count the number of cars on the highways for traffic analysis.

In a further scenario, embodiments of the surveillance system 100 may be used for customer queue and flow analytics. In places where customers line up for service, such as coffee shops, supermarkets, or amusement parks, management has an interest in knowing numbers of people waiting in line and the dynamics thereof over the course of a day. ECNs 104 and associated video cameras 102 may be used to track how people move through retail establishments. Other use scenarios for the surveillance system 100 are contemplated.

Figure 7:
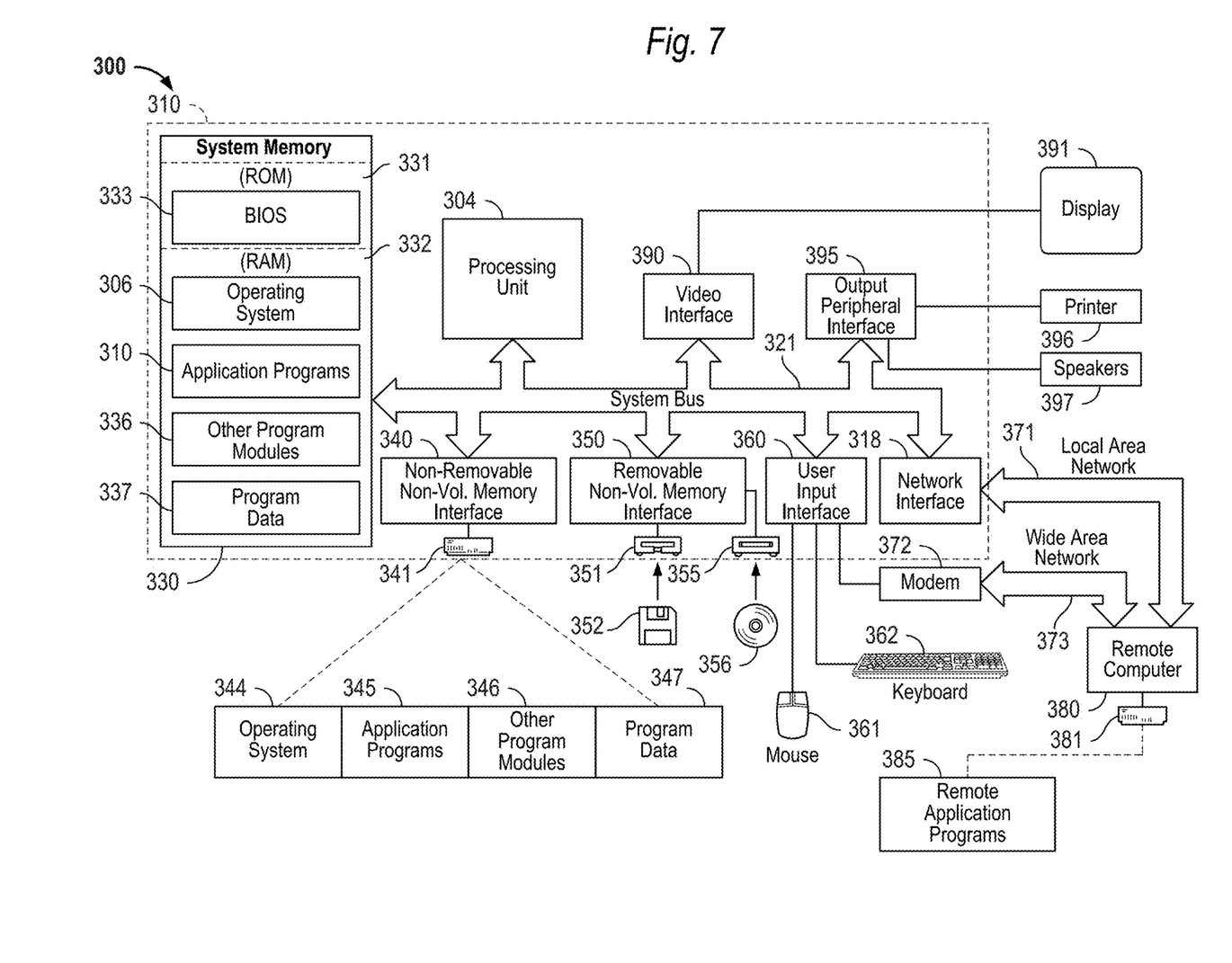
FIG. 7 is a block diagram of an exemplary computing environment for use with the present technology.

FIG. 7 illustrates a sample computing system 300, which may for example be an ECN 104 and/or controller 110. The system architecture shown in FIG. 7 is by way of example, and it is understood that the present system may be operational with numerous other general purpose or special purpose computing systems, environments or configurations. Examples of well-known computing systems, environments and/or configurations that may be suitable for use with the present system include, but are not limited to, personal computers, server computers, multiprocessor systems, microprocessor-based systems, network PCs, minicomputers, hand-held computing devices, mainframe computers, and other distributed computing environments that include any of the above systems or devices, and the like. In the distributed and parallel processing cluster of computing systems used to implement the present system, tasks are performed by remote processing devices that are linked through a communication network. In such a distributed computing environment, program modules may be located in both local and remote computer storage media including memory storage devices.

With reference to FIG. 7, an exemplary computing system 300 for use in performing the above-described methods includes a general purpose computing device. Components of computing system 300 may include, but are not limited to, a processing unit 304, a system memory 316, and a system bus 321 that couples various system components including the system memory to the processing unit 304. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable storage medium does not include transitory, modulated or other types of signals The system memory 316 includes computer readable storage media in the form of volatile and/or nonvolatile memory such as ROM 331 and RAM 332. A basic input/output system (BIOS) 333, containing the basic routines that help to transfer information between elements within computing system 300, such as during start-up, is typically stored in ROM 331. RAM 332 typically contains data and/or program modules that are immediately accessible to and/or presently being operated on by processing unit 304. By way of example, and not limitation, FIG. 7 illustrates operating system 306, application programs 310, other program modules 336, and program data 337.

The computing system 300 may also include other removable/non-removable, volatile/nonvolatile computer readable storage media. By way of example only, FIG. 7 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD-ROM or other optical media. Other removable/non-removable, volatile/ nonvolatile computer storage media that can be used in the exemplary operating environment include, but are not limited to, magnetic tape cassettes, flash memory cards, DVDs, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 7 provide storage of computer readable instructions, data structures, program modules and other data for the computing system 300. In FIG. 7, for example, hard disk drive 341 is illustrated as storing operating system 344, application programs 345, other program modules 346, and program data 347. These components can either be the same as or different from operating system 306, application programs 310, other program modules 336, and program data 337. Operating system 344, application programs 345, other program modules 346, and program data 347 are given different numbers here to illustrate that, at a minimum, they are different copies.

A user may enter commands and information into the computing system 300 through input devices such as a keyboard 362 and pointing device 361, commonly referred to as a mouse, trackball or touch pad. Other input devices (not shown) may be included. These and other input devices are often connected to the processing unit 304 through a user input interface 360 that is coupled to the system bus 321, but may be connected by other interface and bus structures, such as a parallel port, game port or a universal serial bus (USB). A monitor 391 or other type of display device is also connected to the system bus 321 via an interface, such as a video interface 390. In addition to the monitor 391, computers may also include other peripheral output devices such as speakers 397 and printer 396, which may be connected through an output peripheral interface 395.

As indicated above, the computing system 300 may operate in a networked environment using logical connections to one or more remote computers in the cluster, such as a remote computer 380. The remote computer 380 may be a personal computer, a server, a router, a network PC, a peer device or other common network node, and typically includes many or all of the elements described above relative to the computing system 300, although only a memory storage device 381 has been illustrated in FIG. 7. The logical connections depicted in FIG. 7 include a local area network (LAN) 371 and a wide area network (WAN) 373, but may also include other networks. Such networking environments are commonplace in offices, enterprise-wide computer networks, intranets and the Internet.

When used in a LAN networking environment, the computing system 300 is connected to the LAN 371 through a network interface or adapter 318. When used in a WAN networking environment, the computing system 300 typically includes a modem 372 or other means for establishing communication over the WAN 373, such as the Internet. The modem 372, which may be internal or external, may be connected to the system bus 321 via the user input interface 360, or other appropriate mechanism. In a networked environment, program modules depicted relative to the computing system 300, or portions thereof, may be stored in the remote memory storage device. By way of example, and not limitation, FIG. 7 illustrates remote application programs 385 as residing on memory device 381. It will be appreciated that the network connections shown are exemplary and other means of establishing a communications link between the computers may be used.

In summary, embodiments of the present technology relate to a surveillance system, comprising: a plurality of computing devices, associated with a plurality of video cameras capturing videos of a geographic area, the plurality of computing devices configured to process the videos to generate analytic data, the analytic data from the plurality of computing devices indicating utility detected at time slots in the videos over a period of time relative to search criteria received for the videos; and a controller configured to receive the analytic data from the plurality of computing devices and select a video from a time slot to upload from a computing device of the plurality of computing devices during the period of time based on the utility of the video during the time slot.

In another embodiment, the present technology relates to a surveillance system, comprising: a plurality of computing devices, associated with a plurality of video cameras capturing videos of items in a geographic area, the plurality of computing devices configured to process the videos to generate analytic data, the analytic data from the plurality of computing devices indicating utility of video detected at time slots in the videos over a period of time; and a controller, communications passing between the plurality of computing devices and the controller at least in part by a wireless network having a bandwidth, the controller selecting a plurality of video frames for upload from one or more of the plurality of computing devices based on the analytic data received from the plurality of computing devices, the controller prioritizing an order in which the plurality of video frames are uploaded based on bandwidth availability and the analytic data.

In another embodiment, the present technology relates to a computer readable storage medium for controlling a processor to perform a method of selectively uploading video of a live event, the method comprising: (a) receiving analytic data from each of a plurality of computing devices, the plurality of computing devices associated with a plurality of video cameras capturing videos of the live event; (b) determining a computing device from the plurality of computing devices from which to request video based on the analytic data indicating that the computing device has a high utility over a period of time; and (c) issuing a request for video from the computing device determined in said step (b).

In a further embodiments, the present technology relates to a surveillance system including means for processing videos to generate analytic data, the videos coming from video generation means generating video of items to track in a geographic area, the analytic data from the means for processing videos indicating numbers of tracked items detected at time slots in the videos over a period of time; and means for receive the analytic data from the plurality of computing devices and selecting a video frame to upload during the period of time based on the count of tracked items appearing in the video frame.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

We claim:

1. A surveillance system, comprising:
a plurality of computing devices, associated with a plurality of video cameras capturing videos of a geographic area, the plurality of computing devices configured to process the videos to generate analytic data, the analytic data from the plurality of computing devices indicating utility detected in the videos during a period of time relative to search criteria received for the videos, wherein utility is a measure of a number of tracked items detected in the videos relevant to the search criteria received for the videos;
a controller configured to receive the analytic data from the plurality of computing devices relating to the search criteria for the videos, and to select a video to upload from a computing device of the plurality of computing devices during the period of time based on the utility of the video to the search criteria for the videos, the controller requesting the video from the computing device having a highest average utility of tracked items to the search criteria for the videos over the period of time to upload; and
a wireless transmitter for wirelessly transmitting the analytic data from the computing device containing the video selected by the controller,
wherein the controller estimates a wireless transmitter transmission capacity by examining near-term sending rates and loss rates of the wireless transmitter to estimate a number of bits that the wireless transmitter can upload within the period of time and the wireless transmitter transmits all of the video during the period of time when a product of wireless transmit capacity of the wireless transmitter and a length of the period of time is greater than a size of the video frames to be uploaded in the period of time and transmits part of the video during the period of time, in a decreasing order of utility, when the product of the wireless transmit capacity of the wireless transmitter and a length of the period of time is less than a size of the video frames to be uploaded during the period of time.

2. The surveillance system of claim 1, wherein the analytic data for the computing device includes a frame index and a frame utility of tracked items in a period of time associated with the frame index.

3. The surveillance system of claim 2, wherein the frame utility of tracked items associated with the frame index is different than a frame utility of tracked items in a frame index associated with a next-earlier period of time.

4. The surveillance system of claim 1, wherein the analytic data for the computing device includes one or more frame indices representing one or more periods of time having a different number of tracked items than one or more immediately-preceding periods of time, and a count of tracked items in the one or more periods of time associated with the one or more frame indices.

5. The surveillance system of claim 1, wherein utility for the plurality of computing devices is a measure of one of: i) numbers of tracked items in periods of time, ii) whether a tracked item is detected or not detected in the periods of time, and iii) a probability measure of whether a tracked item is detected in the periods of time.

6. The surveillance system of claim 1, wherein a computing device of the plurality of computing devices is co-located with a video camera of the plurality of video cameras.

7. The surveillance system of claim 1, wherein a computing device of the plurality of computing devices is connected with a video camera of the plurality of video cameras by a wired connection.

8. A surveillance system, comprising:
a plurality of computing devices, associated with a plurality of video cameras capturing videos of items in a geographic area, the plurality of computing devices configured to process the videos to generate analytic data, the analytic data from the plurality of computing devices indicating utility of video detected in the videos during a period of time relative to search criteria received for the videos, wherein utility is a measure of a number of tracked items detected in the videos relevant to the search criteria received for the videos;
a wireless network; and
a controller that communicates with the plurality of computing devices at least in part via the wireless network, the controller selecting a plurality of video frames for upload from one or more of the plurality of computing devices via the wireless network based on the analytic data received from the plurality of computing devices relating to the search criteria for the videos, the controller prioritizing an order in which the plurality of video frames are uploaded based on bandwidth availability of the wireless network and the analytic data of the video frames to be uploaded during the period of time, the analytic data identifying a computing device having a highest average utility of tracked items to upload during the period of time,
wherein the wireless network allocates bandwidth for use as a wi-fi hotspot during the period of time when less than an entire bandwidth of the wireless network is taken up transmitting image data from the one or more computing devices.

9. The surveillance system of claim 8, wherein the entire plurality of video frames are uploaded if there is available bandwidth at a time when the entire plurality of video frames are sent.

10. The surveillance system of claim 8, wherein a portion of the plurality of video frames is uploaded if there is not available bandwidth to send the entire plurality of video frames at a time when the entire plurality of video frames are sent, the portion comprising one or more video frames from a computing device having a highest average utility over the period of time.

11. The surveillance system of claim 10, wherein the portion of the plurality of video frames from the computing device further comprise the video frame from the computing device having a highest utility over the period of time.

* * * * *